Patented Aug. 3, 1954

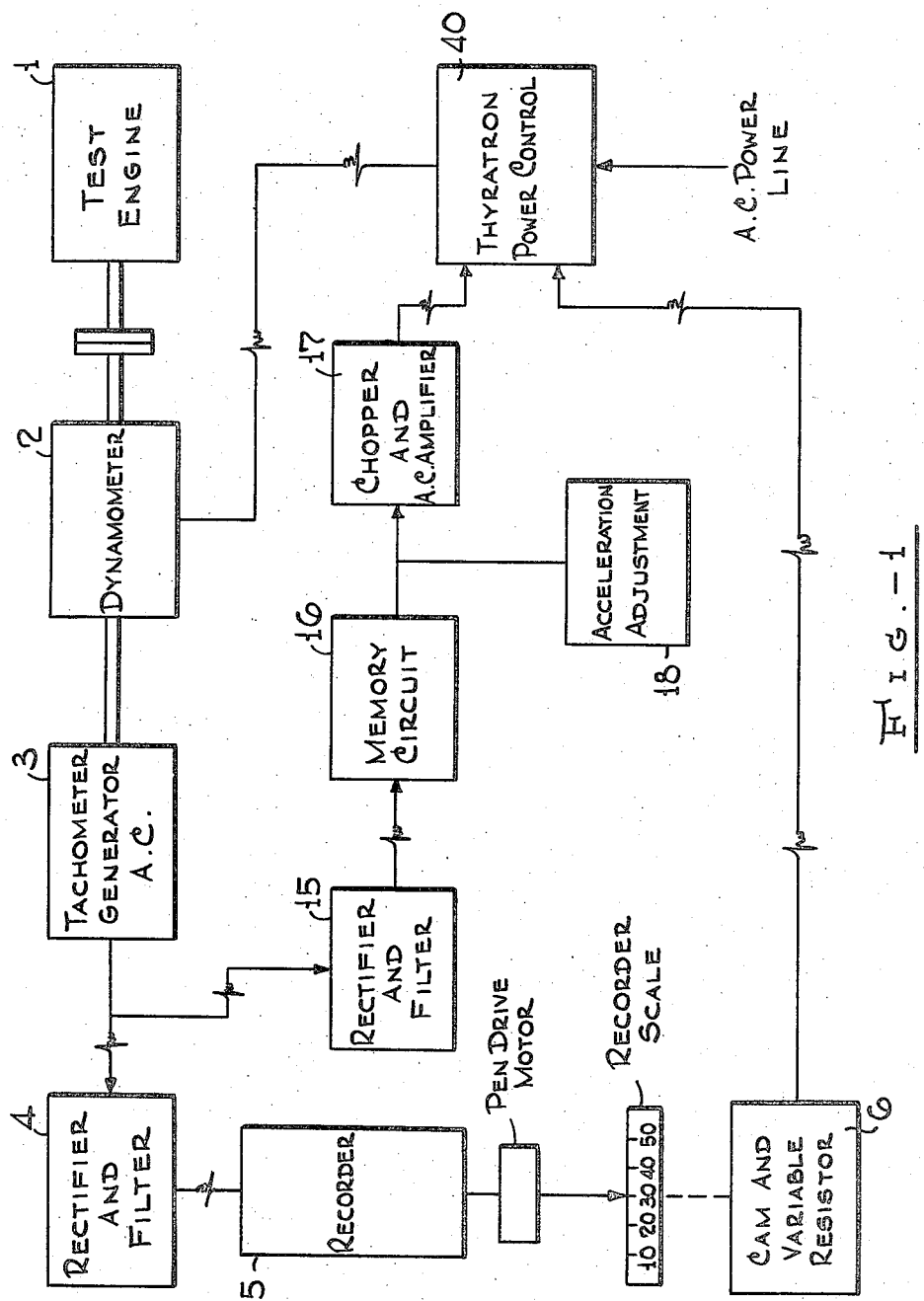

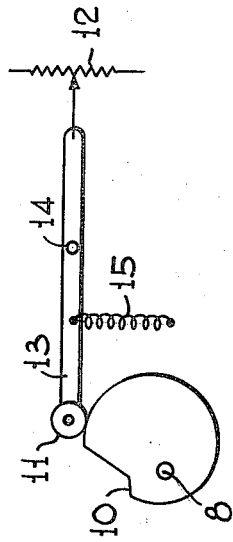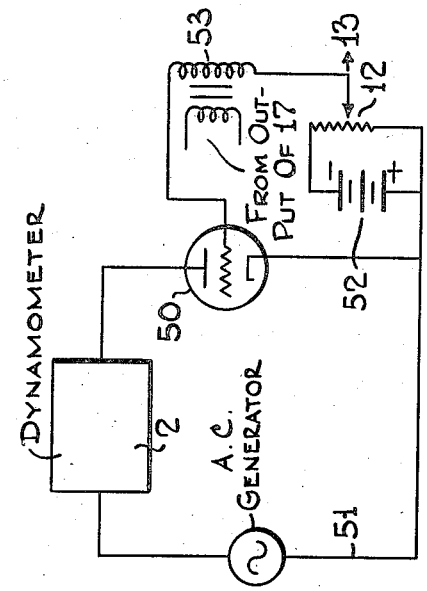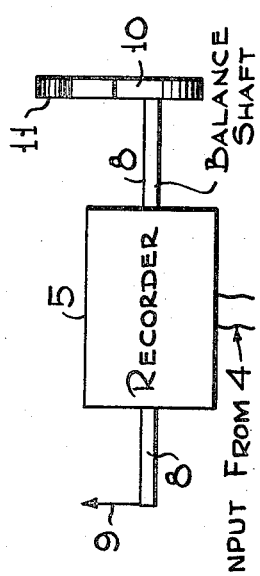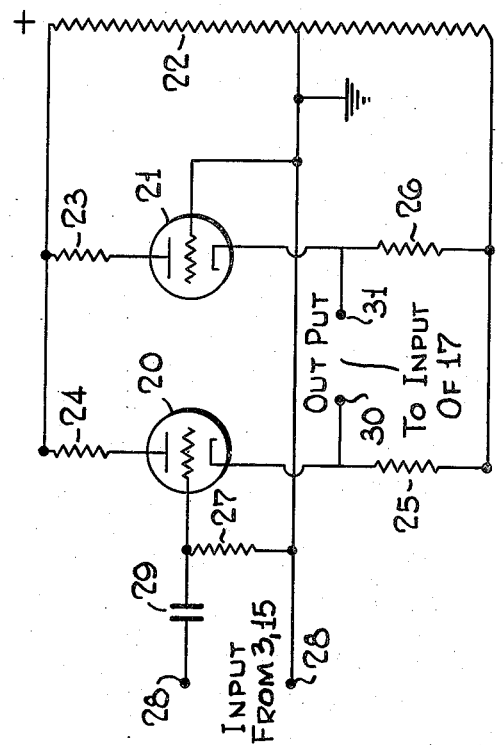

2,685,199

UNITED STATES PATENT OFFICE 2,685,199

APPARATUS FOR TESTING ENGINES

James A. Wilson, Linden, and Albert E. Brenneman, Westfield, N. J., assignors to Standard Oil Development Company, a corporation of Delaware Application September 29, 1950, Serial No. 187,376

4 Claims. (Cl. 73—116)

This invention concerns an improved form of apparatus for testing internal combustion engines. The apparatus is adapted to provide a laboratory engine-testing means by which it is possible to precisely duplicate the loading conditions to which an internal combustion engine is subjected when in actual use.

In the characterization and development of suitable fuels for internal combustion engines, it has been important to develop suitable tests to properly evaluate different fuels. Towards this end, many fuel tests have been developed and are employed. For example, different procedures are used to determine the octane number of a gasoline type fuel—the octane number determination providing some indication of the suitability of a given fuel for use in an internal combustion engine. However, it has been found that presently known laboratory fuel tests are inadequate to fully characterize the road performance characteristics of a fuel. Thus, for example, it has been found that the actual performance of two different fuels under actual road conditions in an internal combustion engine may be quite different than the laboratory tests of the two fuels would indicate. This difficulty has been appreciated for some time and efforts have been made to provide suitable laboratory tests to accurately predict the road performance characteristics of fuels. However, it has been heretofore impossible to devise any suitable laboratory method which would accurately provide the road operating characteristics of fuels.

The present invention concerns apparatus capable of accurately evaluating the road performance characteristics of a fuel under laboratory conditions. By utilizing the apparatus of this invention, it is possible to fully simulate in the laboratory the conditions of operation to which an engine is subjected in actual use. Thus, the apparatus of this invention permits loading of an engine to duplicate the power requirements to maintain the vehicle at a constant speed which constitutes overcoming wind and frictional resistance, or to accelerate the vehicle, which constitutes overcoming the inertia. At the same time, it is possible to select and control the weather or atmospheric conditions, the coolant temperatures, the air fuel mixture and all other variables.

In considering the requirements of apparatus to simulate the actual loading to which, for example, an automobile engine is subjected, it may be considered that two principal load requirements exist. The first of these is the load requirements the engine must meet to maintain a given vehicle at any given constant speed. Factors affecting the constant speed loading will include the friction of the vehicle, its wind resistance, and so on. The second load requirement corresponds to the engine requirements to accelerate the vehicle. The total dynamic loading may be considered as including the constant speed loading requirements plus the power required to overcome the inertia of the car to achieve acceleration.

In accordance with this invention, the laboratory testing apparatus provided may be considered as comprising two separate engine-loading controls employed in combination to simulate either or both the constant speed loading requirements and the acceleration loading requirements of the engine at any desired speed and at any desired acceleration respectively. It is a particular feature of this apparatus that these two loading systems function independently so that the acceleration loading provided in addition to a constant speed loading is correct regardless of changes in the efficiency of the engine.

The nature of this invention may be fully understood by reference to the following description drawn in connection with the accompanying drawings, in which Figure 1 illustrates the integral apparatus elements required in the form of a block diagram;

Figure 2 diagrammatically illustrates the recorder controlled variable cam assembly employed in the constant speed loading portion of the apparatus;

Figure 3 shows a right side view of Figure 2 to more clearly show the operation of the elements of Figures 2 and 3;

Figure 4 shows a suitable electronic circuit to provide the "memory circuit" portion of the apparatus; and, Figure 5 shows the manner in which the dynamometer of the apparatus is controlled by thyratron circuit provided.

Referring now to Figure 1, the complete apparatus elements of the novel road testing apparatus of this invention are indicated. Each of the required elements is diagrammatically illustrated by a rectangle bearing legends to indicate the nature or function of the apparatus elements. Thus, the numeral 1 designates the engine which is to be submitted to simulated road operating test conditions. It is to be understood that the engine to be tested may consist of any desired type of prime mover including both automotive and aviation type internal combustion engines. Engine 1 is connected to and operates a conventional type of electric dynamometer 2. As will be understood, the electric dynamometer is a form of electric brake to load the engine 1 in response to D. C. control voltages applied to the dynamometer capable of varying the engine loading in proportion to the magnitude of the control voltages. The dynamometer 2 is operatively connected to a magneto type tachometer of conventional design. It is to be understood that this tachometer will generate an A. C. electrical voltage proportional to the speed of rotation of the engine 1 or of the dynamometer shaft. As will be apparent a tachometer of the type producing a D. C. voltage output may be employed in place of the A. C. type tachometer. The electrical output of tachometer 3 is then applied to one control system capable of controlling the D. C. control voltage applied to dynamometer 2 to provide the load requirements to simulate constant speed operation of test engine 1. The electrical output of the tachometer 3 is also applied to a second control circuit capable of varying the D. C. control voltage applied to dynamometer 2 in order to simulate the load requirements of engine 1 under acceleration conditions.

Describing first the constant speed control circuit of the apparatus, a portion of the electrical output of tachometer generator 3 is applied to a rectifier and filter element 4 capable of converting the A. C. output of tachometer 3 to a D. C. voltage. The D. C. voltage output of rectifying element 4 will be proportional in magnitude to the rotational speed of test engine 1. This D. C. voltage is employed to control the value of a variable resistance so that the value of the resistance will be a function of the magnitude of the D. C. voltage or of the rotational speed of the test engine. A suitable method of achieving this result is to apply the D. C. voltage of rectifying element 4 to a conventional type of recorder indicated by numeral 5. The pen of the recorder 5 will be controlled by the applied D. C. voltage so as to produce a record which may be calibrated to indicate the velocity at which a vehicle would be propelled by operation of the test engine under the applied loading. Thus, as indicated on the drawing, the record scale of recorder 5 may be calibrated to indicate the speed at which an automobile would be operated by the test engine. The recorder 5, as indicated, is employed to control a suitable cam so as to control the value of a variable resistance in accordance with the desired constant speed loading conditions. This element of the apparatus is indicated by numeral 6. As will be described more fully, element 6 comprises a cam and variable resistance controlled thereby which will control a D. C. voltage output to be employed to control the loading of the test engine by the dynamometer under constant speed conditions. The recorder and the associated cam and variable resistance therefore serves to convert the output of the tachometer, which varies linearly with engine speed, to a nonlinear electrical signal satisfying the true velocity function.

As heretofore described, therefore, the test apparatus includes a constant speed control circuit operative to develop a D. C. control voltage which may be employed to load the test engine so as to simulate constant speed load requirements. The manner in which this is achieved will be more readily appreciated by reference to Figures 2 and 3 of the drawing which diagrammatically illustrates the cam and resistor portion of the control circuit. Referring to Figures 2 and 3, the balance shaft 8 of recorder 5 may be employed not only to control the position of a pen 9 recording the simulated velocity but also to control the rotational position of a cam 10. The cam 10 is arranged to contact a cam follower 11 arranged in a system of mechanical linkages to control a variable resistance 12. Thus, the follower 11 may be supported by a lever 13 pivoted at the fulcrum 14. The follower 11 will be urged against cam 10 by spring 15. It is apparent that on rotation of balance arm 8, and the consequent rotation of cam 10, the position of the sliding contact of potentiometer 12 will be varied. Cam 10 may consequently be cut to any desired configuration so as to vary the resistance of potentiometer 12 in accordance with any desired constant speed loading requirement. This is practically achieved by determining the mechanical displacement of the cam follower required to satisfy the constant speed loading requirements of a particular car at any desired speed.

Having now described the constant speed control circuit of the apparatus, a description of the acceleration portion of the apparatus illustrated in Figure 1, will be presented. A portion of the A. C. output of tachometer 3 is applied to a second rectifier and filter element 15 which, like element 4, converts the A. C. output of tachometer 3 to a D. C. voltage. This D. C. voltage appears at the input terminals of memory circuit 16. The D. C. output of memory circuit 16 changes in magnitude proportional to the rate of change of the D. C. voltage applied to the memory circuit, and will reverse its polarity when the direction of change of the input D. C. voltage is reversed. The memory circuit therefore supplies the function of varying an output D. C. voltage in accordance with the rate of variation of an input voltage. As the rate of variation of the input voltage to the memory circuit is proportional to the changes in speed, or the acceleration, of the test engine, this circuit provides the basic requirements of an acceleration control circuit.

In order to utilize this memory circuit to control the loading of the dynamometer in accordance with changes in engine speed, the D. C. output of the memory circuit is converted to an A. C. control voltage. This is accomplished by supplying the output of circuit 16 to a "chopper" and amplifying circuit 17. The "chopper" is operative to convert the D. C. input to an A. C. output proportional in magnitude to the rate of change of the D. C. input voltage, or in other words, to the rate of change in the speed of the test engine. In addition, the A. C. output of the chopper-amplifier will change phase 180° on change of the polarity of the D. C. input signal or in other words in response to an acceleration or deceleration of the test engine. The A. C. voltage output of the chopper and amplifying circuit therefore provides intelligence as to the rate of acceleration or deceleration of the test engine.

In order to employ this system to simulate any desired acceleration conditions, an "acceleration adjustment" 18 is provided. In its simplest form this adjustment may simply be a potentiometer or gain control operative to proportion the degree of acceleration loading by varying the attenuation of the D. C. output of the memory circuit.

Suitable apparatus or circuits to provide the function of the chopper-amplifier 17 are well known, so that no further description of this element of the apparatus seems required. However, for clarity, an example of a suitable "memory circuit" will be given. The nature of a suitable memory circuit may be fully understood by reference to Figure 4, of the drawings, which diagrammatically indicates a circuit diagram of an operative memory circuit. As indicated in Figure 4, the memory circuit comprises two vacuum tubes 20 and 21 which may be of the triode type. This memory circuit may be described as a self-stabilizing bridge circuit in which the cathodes of the vacuum tubes develop identical D. C. outputs when identical voltages are imposed on the grid circuits of the tubes. The plate operating potentials of triodes 20 and 21 are supplied by voltage source 22 through plate resistors 23 and 24 and through cathode resistors 25 and 26. The grids of tubes 20 and 21 are connected together through resistor 27 and are connected to a tap on voltage source 22. The D. C. voltage output of rectifying element 15 is applied to this circuit across terminals 28. One of the terminals 28 is connected to the grid of triode 20 through a condenser 29 while the other of terminals 28 is connected directly to the grid of triode 21. By virtue of this circuit, the combination of resistor 27 and condenser 29 imposes an RC delay in the application of the D. C. voltage to the grid of triode 20. The time constant of the resistance and capacitance may be chosen to provide a lag of about $\frac{1}{10}$ of a second, for example. Consequently, a D. C. differential voltage will appear between the cathodes of triodes 20 and 21 proportional to changes in the D. C. voltage applied to terminals 28. Thus, the D. C. output voltage of the circuit appearing at terminals 30 and 31 will be nil when the D. C. voltage applied to terminals 28 is constant. However, on changing the D. C. voltage applied to terminals 28, a D. C. voltage will appear across output terminals 30 and 31. In this manner, the circuit of Figure 4 is operated to provide the required memory functions heretofore indicated.

Consequently, as described, the output of element 6 of Figure 1 will provide a D. C. control voltage proportional to the constant speed loading requirement desired. Again, element 17 will provide an A. C. control voltage proportional to the acceleration requirements as controlled by the acceleration adjustment 18. These D. C. and A. C. control voltages may be employed to suitably control the dynamometer 2 by applying these voltages to a thyratron power control means 40. Both the D. C. and A. C. control voltages will be applied to the control grid of the thyratron 2. By supplying a suitable A. C. power source across the plate and cathode of the thyratron, the D. C. plate voltage developed by the thyratron will be controlled by the D. C. and A. C. grid control voltages applied from elements 6 and 17. The manner in which this is carried out may be better understood by reference to Figure 5.

Referring to Figure 5, a thyratron is indicated by the numeral 50. A suitable A. C. voltage is supplied across the plate and cathode of thyratron 50, as diagrammatically illustrated by circuit 51. The grid cathode circuit of thyratron 50 includes variable resistance 12 controlled by the cam of element 6 of Figure 1. A D. C. potential source 52 is connected across potentiometer 12, as shown, so the D. C. voltage applied to the cathode-grid circuit is proportional to the setting of the variable tap of the potentiometer 12. This variable tap is connected in series with the secondary of a transformer 53. The primary of transformer 53 is connected to the output of the chopper-amplifier element 17 of Figure 1. Consequently, by virtue of the circuit of Figure 5, the effective D. C. power appearing in the plate circuit of thyratron 50 supplied to dynamometer 2 will be a function of the D. C. output inserted in the grid circuit as controlled by cam element 6 and potentiometer 12 and will also be a function of the A. C. output controlled by chopper element 17.

What is claimed is:
1. An apparatus for simulating actual use loading of a prime mover under both constant speed requirements and acceleration requirements comprising in combination a load imposing electric dynamometer adapted to be driven by said prime mover, means responsive to the speed of said dynamometer to provide a first D. C. voltage proportional to the speed of rotation of the said prime mover, a cam, electro-mechanical means electrically actuated by said first D. C. voltage and mechanically connected with said cam to vary the rotational position of the cam in accordance with the said first D. C. voltage, an electric circuit including a potentiometer, a cam follower adapted to drive the sliding contact of said potentiometer and thereby provide a second D. C. voltage that is controlled by changes in position of the said cam follower, the contour of said cam being of a character to relate the second D. C. voltage to the constant speed loading requirements of the prime mover, means connected to said first mentioned means to provide an A. C. voltage variably proportional to changes of the said first D. C. voltage, a thyratron power circuit adapted to control the loading action of said dynamometer including means for applying said A. C. voltage and said second D. C. voltage in the grid-cathode circuit of said thyratron.

2. In an apparatus for simulating the constant speed and acceleration loading requirements of a prime mover, the combination which comprises a dynamometer driven by said prime mover, means responsive to the speed of the prime mover to provide a first D. C. voltage proportional to the speed of rotation of the prime mover, a cam, means responsive to said first D. C. voltage to vary the rotational position of the cam, a cam follower associated with said cam, a potentiometer circuit, means responsive to changes in position of said cam follower operative to move the movable contact of said potentiometer and thereby provide a second D. C. voltage, second electrical circuit including two vacuum tubes, means for imposing said first D. C. voltage on the grid circuits of the two vacuum tubes, said vacuum tubes being connected in a self-stabilizing bridge circuit whereby the cathodes will develop identical D. C. outputs when identical voltages are imposed on the grid circuits, a resistance-capacitance combination positioned in one of said grid circuits, whereby a differential D. C. voltage will occur between said grids and consequently between said cathodes, means for converting said differential D. C. voltage to an A. C. voltage, means for attenuating said differential D. C. voltage, a thyratron tube, means for applying said second D. C. voltage and said A. C. voltage to the grid of the thyratron and an A. C. power source connected in the plate circuit of said thyratron, said plate circuit being included in the power circuit to said dynamometer.

3. Apparatus as in claim 2 in which the resistance-capacitance combination has a time delay characteristic of about 0.1 second.

4. Apparatus as defined in claim 3 in which the contour of the cam is such as to relate the second D. C. voltage to the constant speed loading requirements of the prime mover.

References Cited in the file of this patent

UNITED STATES PATENTS

| Number | Name | Date |
|---|---|---|
| 2,333,863 | Hull | Nov. 9, 1943 |
| 2,414,356 | Bogen et al. | Jan. 14, 1947 |
| 2,445,095 | Winther | July 13, 1948 |